(12) United States Patent
Saika

(10) Patent No.: US 7,136,855 B2
(45) Date of Patent: Nov. 14, 2006

(54) EXCLUSIVE CONTROL SYSTEM AND METHOD FOR USING SHARED RESOURCE

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 10/794,307

(22) Filed: Mar. 5, 2004

(65) Prior Publication Data

US 2005/0102399 A1     May 12, 2005

(30) Foreign Application Priority Data

Nov. 10, 2003   (JP)   ............................. 2003-380091

(51) Int. Cl.
*G06F 7/00*     (2006.01)
(52) U.S. Cl. .............................. 707/8; 707/10; 709/223
(58) Field of Classification Search ............ 707/8, 707/10, 204; 709/226, 223; 711/147, 148, 711/150; 455/423
See application file for complete search history.

(56) References Cited

U.S. PATENT DOCUMENTS

| | | | |
|---|---|---|---|
| 5,544,353 A * | 8/1996 | Forman et al. | 707/8 |
| 5,619,691 A * | 4/1997 | Katada et al. | 707/204 |
| 5,832,484 A * | 11/1998 | Sankaran et al. | 707/8 |
| 6,226,717 B1 * | 5/2001 | Reuter et al. | 711/147 |
| 6,502,136 B1 | 12/2002 | Higuchi et al. | |
| 6,594,698 B1 * | 7/2003 | Chow et al. | 709/226 |
| 6,597,907 B1 * | 7/2003 | Pruitt et al. | 455/423 |
| 6,839,815 B1 * | 1/2005 | Kagami et al. | 711/148 |
| 6,952,755 B1 * | 10/2005 | Karube | 711/150 |
| 2004/0103099 A1 * | 5/2004 | Minagawa | 707/10 |

FOREIGN PATENT DOCUMENTS

| | | |
|---|---|---|
| JP | 05-265985 | 10/1993 |
| JP | 2000-276457 | * 10/2000 |

\* cited by examiner

*Primary Examiner*—Sam Rimell
*Assistant Examiner*—Paul Kim
(74) *Attorney, Agent, or Firm*—Townsend and Townsend and Crew LLP

(57) ABSTRACT

A plurality of NAS heads 1 to 4 can access a shared LU 18 which stores a shared resource 21 and a count value for the NAS head 1. The NAS head 1 comprises a use resource registration/delete section 35 which accesses the shared resource 21 if the shared resource is in unused status, and does not access the shared resource 21 if the shared resource 21 is used by another NAS head 2 to 4, and a reset section 39 for resetting the count value to zero. The NAS head 2 cancels the use status and release the shared resource 21 to the unused status if the count value exceeds a predetermined threshold and the shared resource 21 remains in use status being used by the NAS head 1. Exclusive control for using a shared resource is performed.

9 Claims, 11 Drawing Sheets

| SHARED RESOURCE NAME | NAS-ID |
|---|---|
| RESOURCE-1 | |
| RESOURCE-2 | |
| RESOURCE-3 | |
| . . . . . . | |
| RESOURCE-n | |

23B

| NAS-ID | COUNTER | STATUS | NAS-ID OF MONITORING TARGET |
|---|---|---|---|
| 1 | | OPERATING | 2 |
| 2 | | OPERATING | 3 |
| 3 | | OPERATING | 4 |
| 4 | | OPERATING | 1 |

FIG. 8(A)

| NAS-ID | COUNTER | STATUS | NAS-ID OF MONITORING TARGET |
|---|---|---|---|
| 1 | | OPERATING | 2 |
| 2 | | NON-OPERATING | |
| 3 | | OPERATING | 4 |
| 4 | | OPERATING | 1 |

| NAS-ID | COUNTER | STATUS | NAS-ID OF MONITORING TARGET |
|---|---|---|---|
| 1 | | OPERATING | 3 |
| 2 | | NON-OPERATING | |
| 3 | | OPERATING | 4 |
| 4 | | OPERATING | 1 |

~23B

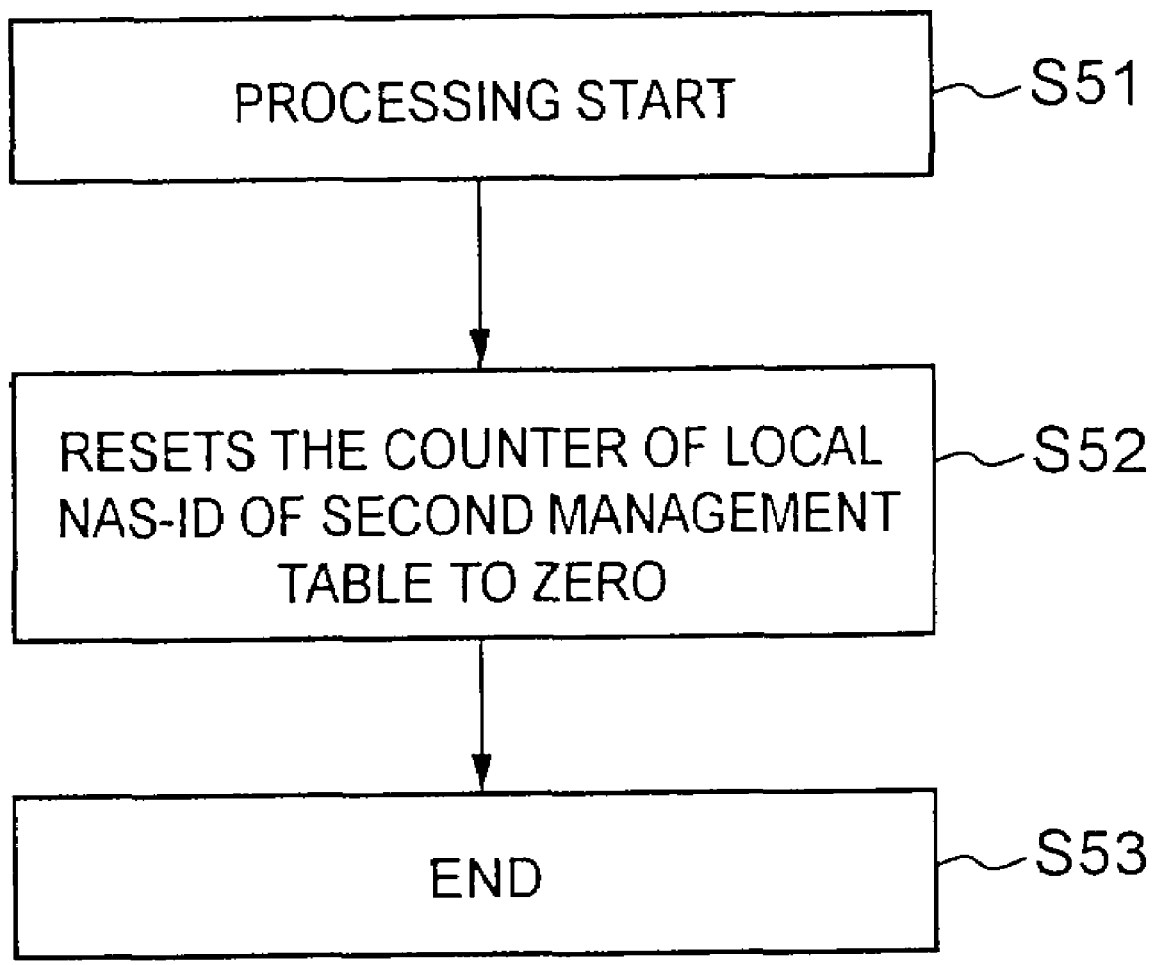

FIG. 10

| NAS-ID | COUNTER | UPDATE TIME (LATEST UPDATE TIME, LAST UPDATE TIME) | STATUS | NAS-ID OF MONITORING TARGET |
|---|---|---|---|---|
| 1 | | | OPERATING | 2 |
| 2 | | | OPERATING | 3 |
| 3 | | | OPERATING | 4 |
| 4 | | | OPERATING | 1 |

EXCLUSIVE CONTROL SYSTEM AND METHOD FOR USING SHARED RESOURCE

CROSS-REFERENCES TO RELATED APPLICATIONS

This application relates to and claims priority from Japanese Patent Application No. 2003-380091 filed on Nov. 10, 2003, the entire disclosure of which is incorporated herein by reference.

BACKGROUND OF THE INVENTION

1. Field of the Invention

The present invention relates to a technology to perform exclusive control for using a shared resource to which a plurality of data access devices can access.

2. Description of the Related Art

As this type of technology, the technology disclosed in Japanese Patent Application Laid-Open No. H5-265985, for example, is known. In this technology a central processing unit (server), which is connected between a plurality of distributed processing units (clients), and a shared disk device, controls access of the plurality of distributed processing units to the shared disk device. Specifically, when the central processing unit receives a file update request from a distributed processing unit, the central processing unit sets the target shared file in lock status, then monitors the duration time of the lock status by a time counter, and detects if the distributed processing unit, which requested the update of the file, is down when time is up before the update of the shared file ends, and if down, the lock status is forcibly cleared.

According to Japanese Patent Application Laid-Open No. H5-265985, it is detected whether the distributed processing unit is down, and the lock status of the shared file is forcibly cleared if down. In Japanese Patent Laid-Open No. H5-265985 however, nothing is disclosed or suggested on how to detect whether a distributed processing unit is down.

Also according to Japanese Patent Laid-Open No. H5-265985, one central processing unit detects whether the plurality of distributed processing units are down, so if an abnormality occurs to the central processing unit itself, exclusive control of use of the shared disk device cannot be performed even if the plurality of the distributed processing units are not down.

BRIEF SUMMARY OF THE INVENTION

It is a feature of the present invention to appropriately detect the presence of an abnormality of each data access device so as to perform exclusive control of use of the shared resource to which a plurality of data access devices can access.

It is another feature of the present invention to perform exclusive control of use of the shared resource continuously, even if one of the devices which are performing exclusive control of use of the shared resource does not operate.

Other features of the present invention will be clarified by the description herein below.

The system according to specific embodiments of the present invention comprises a plurality of data access devices, including a first and second data access devices, and a shared storage device to which the plurality of data access devices can access. The shared storage device stores a shared resource, which the plurality of data access devices can use, and a first updatable information for the first access device (specifically, information which can be updated). The first data access device comprises an access controller that accesses the shared resource if the shared resource is in unused status, that is, not being used by any data access device, and does not access the shared resource if the shared resource is being used by another data access device, and an information updater that updates the first updatable information. The second data access device comprises resource releaser that cancels the use status and releases the shared resource to the unused status if the first updatable information is not in a predetermined update result, and the shared resource remains in use status being used by the first data access device.

For the data access device, various devices can be used only if the device can access the shared resource. For example, when a plurality of NASs (Network Attached Storage) can access a shared resource in a shared storage device, each NAS itself or an NAS head installed therein is the data access device. For another example, when a plurality of host devices can access a shared resource in a shared storage device via a SAN (Storage Area Network), each host device is the data access device.

The shared storage device may be either a physical storage device or a logical storage device.

In this system, the following method may be used to judge which data access device is using the shared resource. That is, each one of the plurality of data access devices has a device ID and accesses the shared device, the device ID is written to the shared storage device, and the first data access device accesses the shared device if the device ID of another data access device is not written to the shared device, and does not access if the device ID of another data access device is not written.

According to the first preferred embodiment, the first updatable information is a count value which is incremented by another data access device. The information updater of the first data access device resets the incremented count value to a predetermined value at a predetermined timing. The resource releaser of the second data access device releases the shared resource to the unused status if the count value exceeds a certain threshold and the shared resource is in the use status.

According to the second preferred embodiment, the plurality of data access devices includes a third data access device, and a third updatable information for the third data access device is recorded in the shared storage device, and the first data access device further comprises another information updater that updates the third updatable information, and the resource releaser of the second data access device releases the shared resource to the unused status if the third updatable information is not in a predetermined update result, and the shared resource is in the use status.

According to the third preferred embodiment, in the second preferred embodiment, the update time of the third updatable information is also recorded in the shared storage device, and the first data access device further comprises another information updater that updates the third updatable information and records the update time thereof in the shared storage device, and the resource releaser of the second data access device judges whether the first data access device is in operating status or not based on the update time recorded in the shared storage device, and releases the shared resource to the unused status is it is judged that the first data access device is not in operating status, and the shared resource is in the use status.

According to the fourth preferred embodiment, when each data access device monitors another data access device, the second data access device judges that the first data access device, which is the monitoring target of the second data access device, is not in operating status if the first updatable information is not updated, searches another data access device in operating status which is not monitored by any data access device, and monitors this other data access device as a monitoring target.

"Monitoring" here may be direct monitoring based on the communication result between the second data access device and the first data access device, or may be an indirect monitoring where the second data access device checks whether said first updatable information is updated.

According to the fifth preferred embodiment, in the fourth preferred embodiment, the shared storage device stores the monitoring relationship information to indicate the correspondence of the data access device and the monitoring target data access device thereof, and the operating status information, to indicate whether each data access device is in operating status or non-operating status, and the second data access device further comprises a component that updates the operating status information based on the judgment that the status of the first data access device, which is the monitoring target thereof, has changed from operating status to non-operating status when the first updatable information is not updated, a component that updates the monitoring relationship information excluding the first data access device from the monitoring target, a component that searches another data access device in operating status, which is a monitoring target of the first data access device of which status has become non-operating status, based on the monitoring relationship information and the operating status information, and a component that updates the monitoring relationship information with this other data access device as a new monitoring target.

According to the sixth preferred embodiment, the plurality of data access devices include a third data access device. The second data access device monitors the first data access device, the first data access device monitors the third data access device, and the third data access device monitors the second data access device. The shared storage device stores the following information (A) to (C) for each of the first to third data access devices, (A) updatable information which is updated to a desired content by a host data access device which monitors the data access device, and is updated to another desired content by the data access device (e.g. a counter value which is counted up by a host data access device, and can be reset to a predetermined value, such as zero, by the data access device that the host data access device is monitoring), (B) operating status information to indicate whether the data access device is in operating status or non-operating status, and (C) slave device information to indicate the slave data access device which the data access device monitors.

The resource releaser of the second data access device executes the following (1) to (3) processing when the first updatable information is not in a predetermined update result, or the third updatable information corresponding to the third data access device is not in a predetermined update result, (1) processing for changing the operating status information corresponding to the first data access device from information to indicate the operating status to information to indicate the non-operating status, (2) processing for changing the slave device information of the second data access device from information to indicate the first data access device to information to indicate the third data access device, which is the slave data access device of the first data access device, and (3) processing for releasing the shared resource to unused status when the shared resource is in use status by the first data access device.

A data access device according to yet another aspect of the present invention is a data access device for accessing a shared storage device to which a plurality of data access devices can access, the shared storage device storing a shared resource which the plurality of data access devices can use, and updatable information which is updated by another data access device, the data access device comprising: an access controller that accesses the shared resource if the shared resource is in unused status, that is not being used by any data access device, and does not access the shared resource if the shared resource is being used by another data access device, and a resource releaser that cancels the use status and releasing the shared resource to the unused status if the updatable information is in a predetermined update result, and the shared resource remains in use status being used by the other data access device.

This data access device is a data access device which is used for the system according to the present invention, and for the systems according to the first to sixth preferred embodiments. Therefore the above mentioned various processings may be performed.

According to the system of the present invention, exclusive control for use of a shared resource is performed based on the judgment whether the updatable information of the shared storage device is updated to a predetermined mode or not. By this, exclusive control for use of a shared resource is appropriately performed.

BRIEF DESCRIPTION OF THE DRAWINGS

FIG. 3 shows the first management table 23A and the second management table 23B.

FIG. 8 shows an update example of the second management table 23B.

FIG. 9 is a flow chart depicting the operation flow of the reset section 39 of the NAS head 1.

FIG. 10 shows the second management table 50 according to the first variant form.

DETAILED DESCRIPTION OF THE INVENTION

Figure 1:
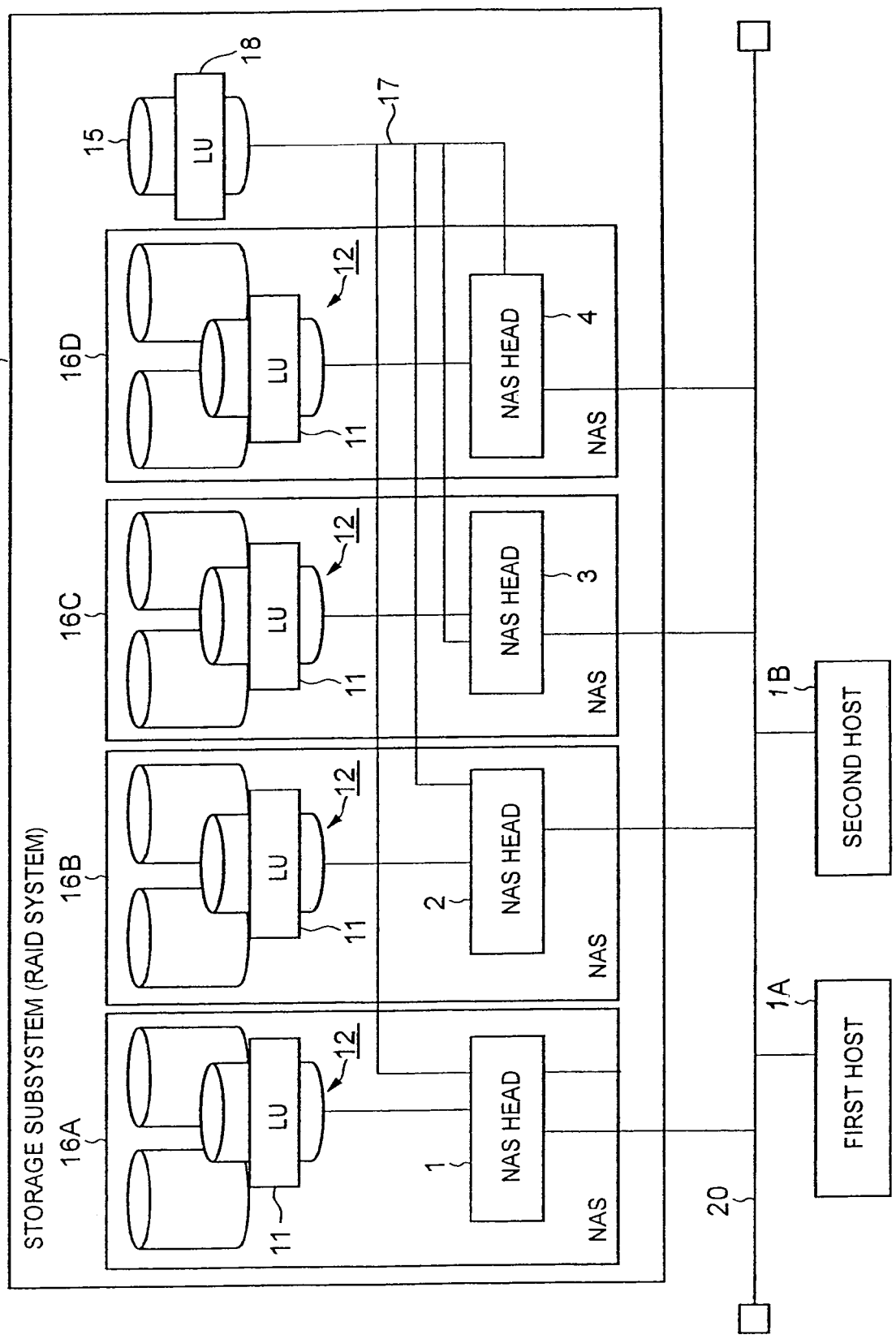
FIG. 1 is a diagram depicting a general configuration of the system according to an embodiment of the present invention.

FIG. 1 shows a general configuration of the system according to an embodiment of the present invention.

In the system according to the present embodiment, 1 or more (e.g. 2) host devices 1A and 1B and the storage subsystem 5 are connected to a communication network, such as LAN 20.

The host devices 1A and 1B are computer machines, such as personal computers, which issue a read request or a write request of data to the storage subsystem 5 in order to read or write a desired data.

The storage subsystem 5 is a RAID (Redundant Array of Independent Inexpensive Disks), for example, which receives a read or write request from the plurality of host devices 1A and 1B respectively, and controls the read or write of data for the host devices 1A and 1B. This storage subsystem 5 is comprised of a plurality of (e.g. 4) NASs (Network Attached Storage) 16A to 16D and one (or a plurality of) shared storage device(s) 15.

The plurality of NASs 16A to 16D have the same characteristics, so NAS 16A will be described as a representative. The NAS 16A is comprised of a storage device group 12 and the NAS head 1.

The storage device group 12 has a plurality of (or 1) data storage devices, and each data storage device has a plurality of (or 1) hard disks which are arranged in an array. In this storage device group 12, a logical storage area (logical unit, hereafter called "LU") 11, where data from the host device 10A and 10B is stored, is provided. Each LU 11 may be disposed in one data storage device 9, or may be provided extending over 2 or more data storage devices.

The NAS head 1 stores unique identification information (hereafter called the "NAS-ID"), and is computer equipment for controlling the data access from the hosts 10A and 10B to LU 11 on the storage device group 12. The NAS head 1 is connected to the shared storage device 15 via a predetermined communication network, such as a SAN (Storage Area Network) 17, and performs various processings using a desired shared resource of a plurality of (or 1) shared resources in the shared LU 18 on the shared storage device 15. The configuration and the functions of the NAS head 1 (and the other NAS heads 2 to 4 mounted in the other NAS 16B to 16D) will be described later.

The shared storage device 15 has a plurality of (or 1) hard disks arranged in an array, for example, and is communicably connected to 4 NAS heads 1 to 4. In the shared storage device 13, a logical (or physical) storage area (hereafter called "shared LU") 18, which is shared by the 4 NAS heads 1 to 4, is provided.

In this system, the 4 NAS heads 1 to 4 refer to the information in the shared LU 18, and executes processing based on this information to implement the exclusive control for use of the shared resource. This will be described in detail herein below.

Figure 2:
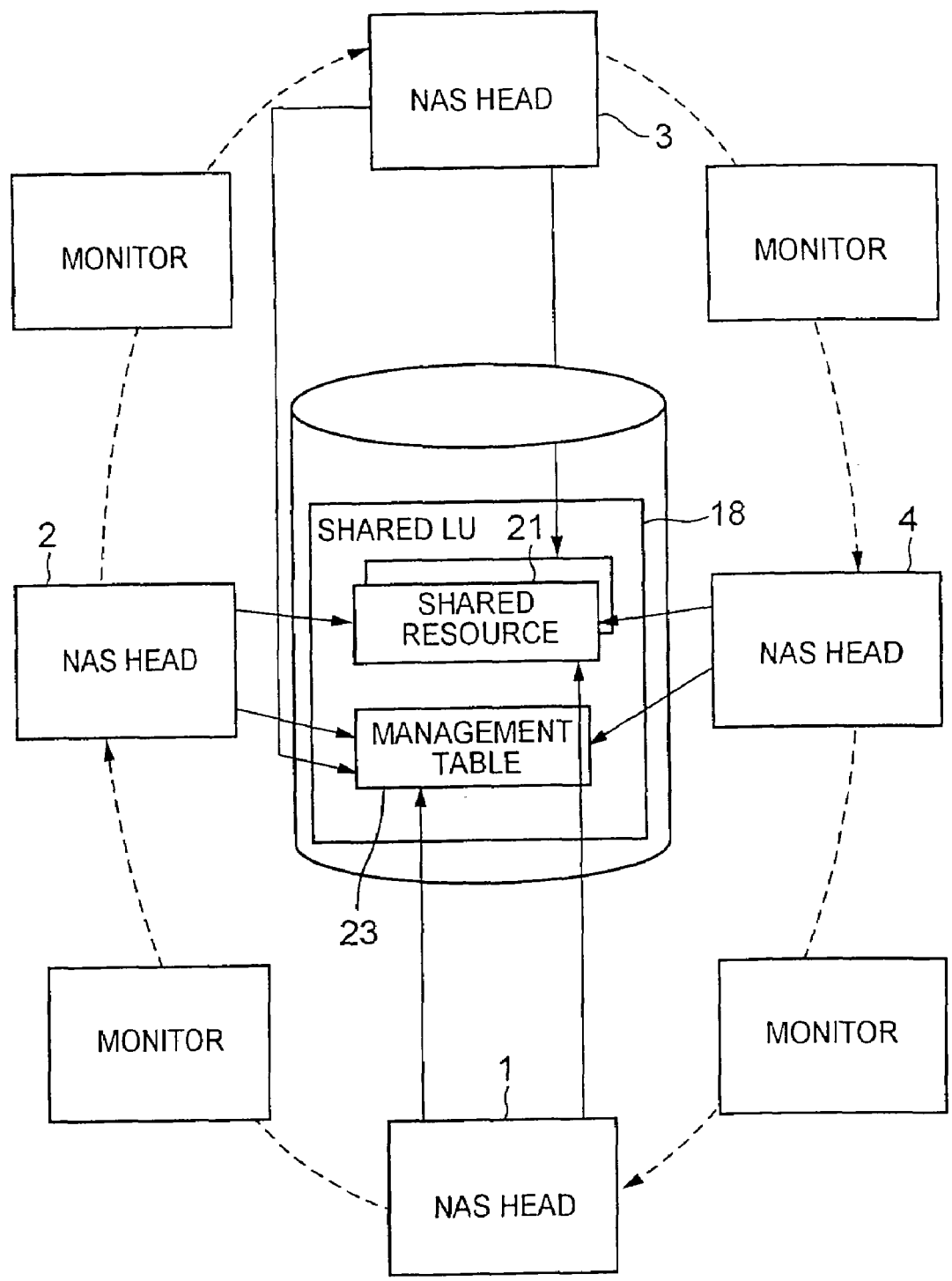
FIG. 2 is a diagram depicting the relationship between the four NAS heads 1 to 4 and the data type in the shared LU 18.

FIG. 2 shows the relationship of the 4 NAS heads 1 to 4 and the data type in the shared LU 18. In the following description, the NAS-ID of each NAS head is the same as the reference number assigned to the NAS head (e.g. the NAS-ID of the NAS head 1 is "1", which is the same as the reference number).

Each one of the NAS heads 1 to 4 monitors another predetermined NAS head. In this example in FIG. 2, the NAS head 1 monitors the NAS head 2, the NAS head 2 monitors the NAS head 3, the NAS head 3 monitors the NAS head 4, and the NAS head 4 monitors the NAS head 1, so that the plurality of NAS heads 1 to 4 form a link type monitoring relationship. "NAS head 1 monitors the NAS head 2", for example, means that the NAS head 1 accesses the second management table 23B and refers to the value of the counter corresponding to the NAS-ID "2" of the NAS head 2, which is the monitoring target.

The shared LU 18 stores a plurality of (or 1) shared resource 21 and the management table 23.

The shared resource 21 is a resource (e.g. file) to which the plurality of NAS heads 1 to 4 can access, and has unique resource identification information (e.g. resource name).

The management table 23 is the table for managing the use status of the shared resource 21 and the relationship of the NAS heads 1 to 4. Specifically, the management table 23 has the first management table 23A for managing the use status of the shared resource 21 and the second management table 23B for managing the relationship of the NAS heads 1 to 4, for example, as shown in FIG. 3.

In the first management table 23A, the shared resource name and the NAS-ID of the NAS head, which uses the shared resource, are recorded for each one of the plurality of shared resources existing in the shared LU 18. In this first management table 23A, the column of the NAS-ID corresponding to the shared resource in unused status indicates information showing the unused status or the column simply remains blank.

In the second management table 23B, the NAS-ID of the local device, the count value which indicates the number of times monitored by the NAS head which monitors the local device, the status of the local device (e.g. operating, non-operating), and the NAS-ID of the target device the local device is monitoring, are recorded for each one of the plurality of NAS heads 1 to 4. If the NAS heads 1 to 4 have the above mentioned link type relationship, the NAS-ID of the monitoring target corresponding to NAS-ID "1" is set to "2", and the NAS-ID of the monitoring target corresponding to NAS-ID "2" is set to "3", for example, in the second management table 23B, as shown in FIG. 3. In other words, in the case of the example in FIG. 3, the NAS-ID is a number, and the monitoring target of each NAS head has an NAS-ID where 1 is added to the NAS-ID of the local device (hereafter called the "local NAS-ID").

Based on the content recorded in the above mentioned first management table 23A and the second management table 23B, each NAS head 1 to 4 and a desired shared resource are used, and the shared resource, which is used by the NAS head of the monitoring target and cannot therefore be used by another NAS head, is released so that the other NAS heads can use it. Now the configuration and the function of each NAS head 1 to 4 will be described. Since the NAS heads 1 to 4 are the same in characteristics, NAS head 1 will be described as a representative.

Figure 4:
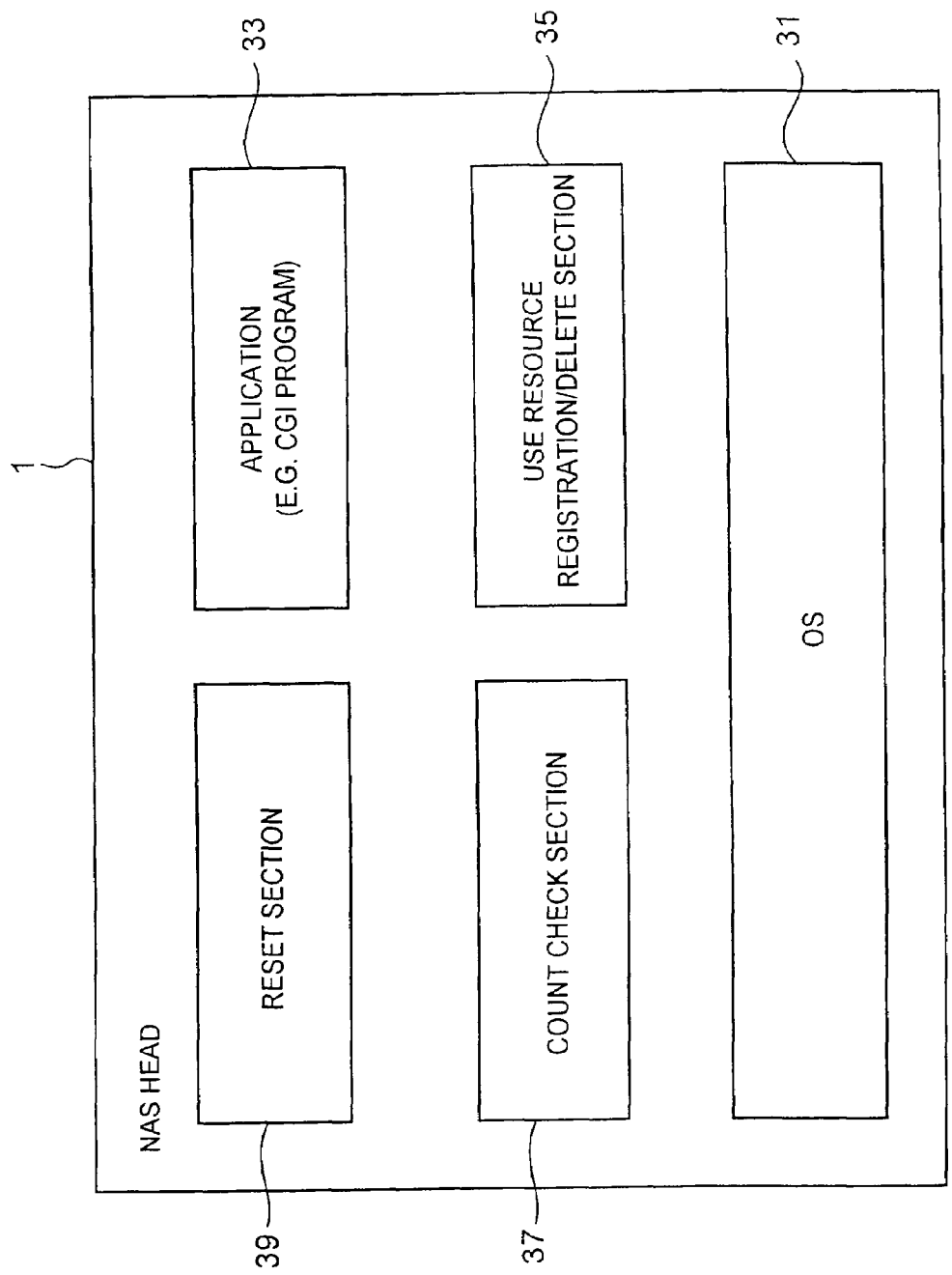
FIG. 4 is a diagram depicting the software configuration of the NAS head 1.

FIG. 4 shows the software configuration of the NAS head 1.

The NAS head 1 is comprised of the operating system (hereafter called the "OS") 31, such as Windows (registered trademark) from Microsoft Corporation, one or a plurality of application programs (e.g. CGI program) 33 which operate on the OS 31, the use resource registration/delete section 35, the count check section 37 and the reset section 39.

The application program 33 has operation management functions for the system administrator to manage NAS 16A to 16D via a web browser, for example, and accesses the shared resource 21 at an arbitrary timing. In this case, the application program 33 calls up the use resource registration/delete section 35, registers the shared resource 21 to be used in the first management table 23A, then accesses and uses (e.g. refers to or updates) the shared resource 21. When use of the shared resource 21 ends, the application program 33 calls up the use resource registration/delete section 35 to notify completion, and deletes the content registered for the shared resource 21 from the first management table 23A.

The use resource registration/delete section 35 is a computer program which is called up from the application program 33, and registers or deletes information on the first management table 23A. The use resource registration/delete section 35 reads NAS-ID "1" of the NAS which the local device has from a predetermined storage area on the NAS head 1, and writes NAS-ID "1" to the NAS-ID column on the first management table 23A, corresponding to the shared resource name of the shared resource 21 which the application program 33 accesses. (If another NAS-ID has already been written, a message to inform that the shared resource is in use is returned to the application 33 which called up the use resource registration/delete section 35.) To delete, on the other hand, the use resource registration/delete section 35 reads NAS-ID "1" of the NAS head 1 from a predetermined storage area on the NAS head 1, detects whether the read NAS-ID "1" is set in the first management table 23A, and if set, this ID "1" is deleted from the first management table 23A.

The count check section 37 is a computer program which identifies that the monitoring target of the NAS head 1 is the NAS head which has NAS-ID "2" referring to the second management table 23B, and counts up the count value corresponding to NAS-ID "2" on the second management table 23B. The count check section 37 increases the count value, and if the count value does not become zero, the count check section 37 judges that the NAS head 2 having NAS-ID "2" is down (that is, non-operating), and checks whether NAS-ID "2", which the non-operating NAS head 2 has, is recorded or not by referring to the first management table 23A. If NAS-ID "2" is recorded as a result, the count check section 37 deletes this ID "2" from the first management table 23A and releases the shared resource which has been used by the NAS head 2, so that the other NAS head 1 or 3 to 4 can access the shared resource. The count check section 37 also changes the status corresponding to NAS-ID "2" of the NAS head 2 which was judged as being down from "operating" to "non-operating" in the second management table 23B. Also the count check section 37 changes the monitoring target NAS-ID corresponding to the NAS-ID "1" from ID "2", of the NAS head which is down, to ID "3", which is 1 added to the above ID "2" in the second management table 23B. If the status corresponding to the NAS-ID "3" is "operating", the count check section 37 continuously sets the NAS head 3, which has NAS-ID "3", as the monitoring target if the status corresponding to the NAS-ID "3" is "operating", and if the status is "non-operating", the count check section 37 performs the above mentioned processing for ID "4", where 1 added to ID "3". When it is judged that the monitoring target NAS head is down, the count check section 37 calculates a new ID, to which 1 is added to the monitoring target NAS-ID (if the new ID exceeds the number of NAS-IDs provided in the second management table 23B, the ID is returned to "1"), identifies whether the NAS head which has the new ID is operating or not, and if operating, the count check section 37 repeats the same processing until the ID of the NAS head in operating status is found, so as to search for a new monitoring target.

The reset section 39 is a computer program which periodically checks the counter value corresponding to the local NAS-ID "1", and resets this to zero in the second management table 23B, so as to notify the NAS head which is monitoring the NAS head 1 that NAS head 1 is not down.

The above is the description of the NAS head 1. In the NAS head 1, the use resource registration/delete section 35, count check section 37 and reset section 39 may be installed as one program set.

Now the operation flow of the application program 33, use resource registration/delete section 35, count check section 37 and reset section 39 of the NAS head 1 will be described.

Figure 5:
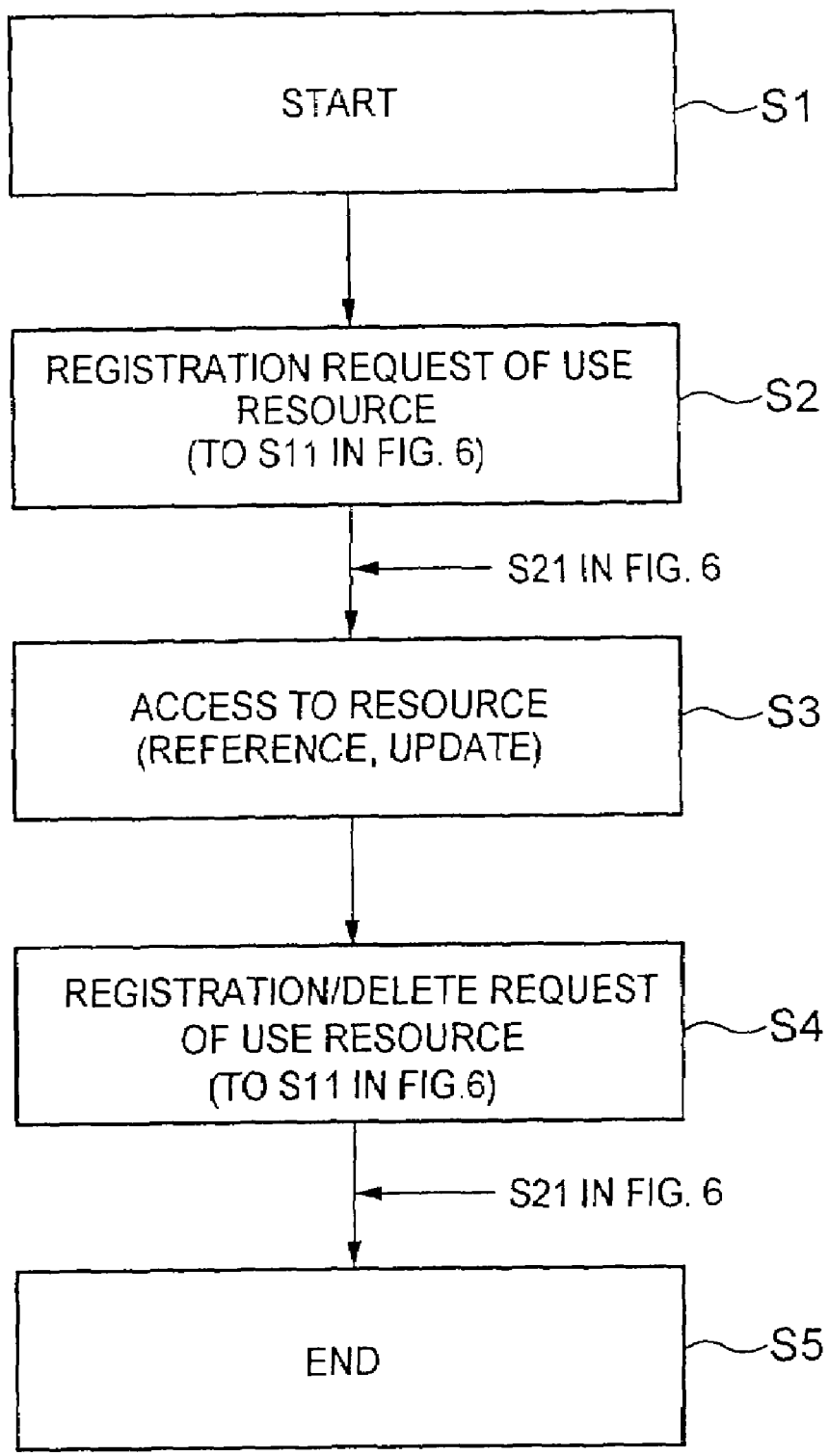
FIG. 5 is a flow chart depicting the operation flow of the application program 33 of the NAS head 1.

FIG. 5 shows the operation flow of the application program 33 of the NAS head 1.

The application program 33 starts the operation which requires use of the shared resource (S1), then calls up the use resource registration/delete section 35, and requests registration of the shared resource to be used to the resource registration/delete section 35, specifically inputs the shared resource name of the shared resource 21 to be used and "registration" as the processing classification (S2).

When the operation of the called up use resource registration/delete section 35 becomes "returns to the call up resource" (in later mentioned S21 in FIG. 6), the application program 33 accesses the shared resource 21 where the local NAS-ID "1" is registered in the first management table 23A (S3).

When use of the shared resource 21 ends, the application program 23 calls up the use resource registration/delete section 35, requests the resource registration/delete section 35 to delete the content which is registered for the use of the shared resource 21 from the first management table 23A, specifically inputs the shared resource name of the shared resource 21 which use is over, and inputs "registration delete" as the processing classification (S4).

When the operation of the called up use resource registration/delete section 35 becomes "returns to the call up source" (in later mentioned S21 in FIG. 6), the application program 33 ends the operation when the predetermined processing is over (S5).

The above is the operation flow of the application program 33. If the application program 33 receives notice that the shared resource 21 is in-use from the use resource registration/delete section 35 after the operation in S2, then the application program 33 either issues a request again using another resource name, for example, or periodically issues a request to the use resource registration/delete section 35 until the status changes to registration possible, and if registration possible status does not occur even after a predetermined time, then the application program 33 may issue a request again specifying another shared resource name.

Figure 6:
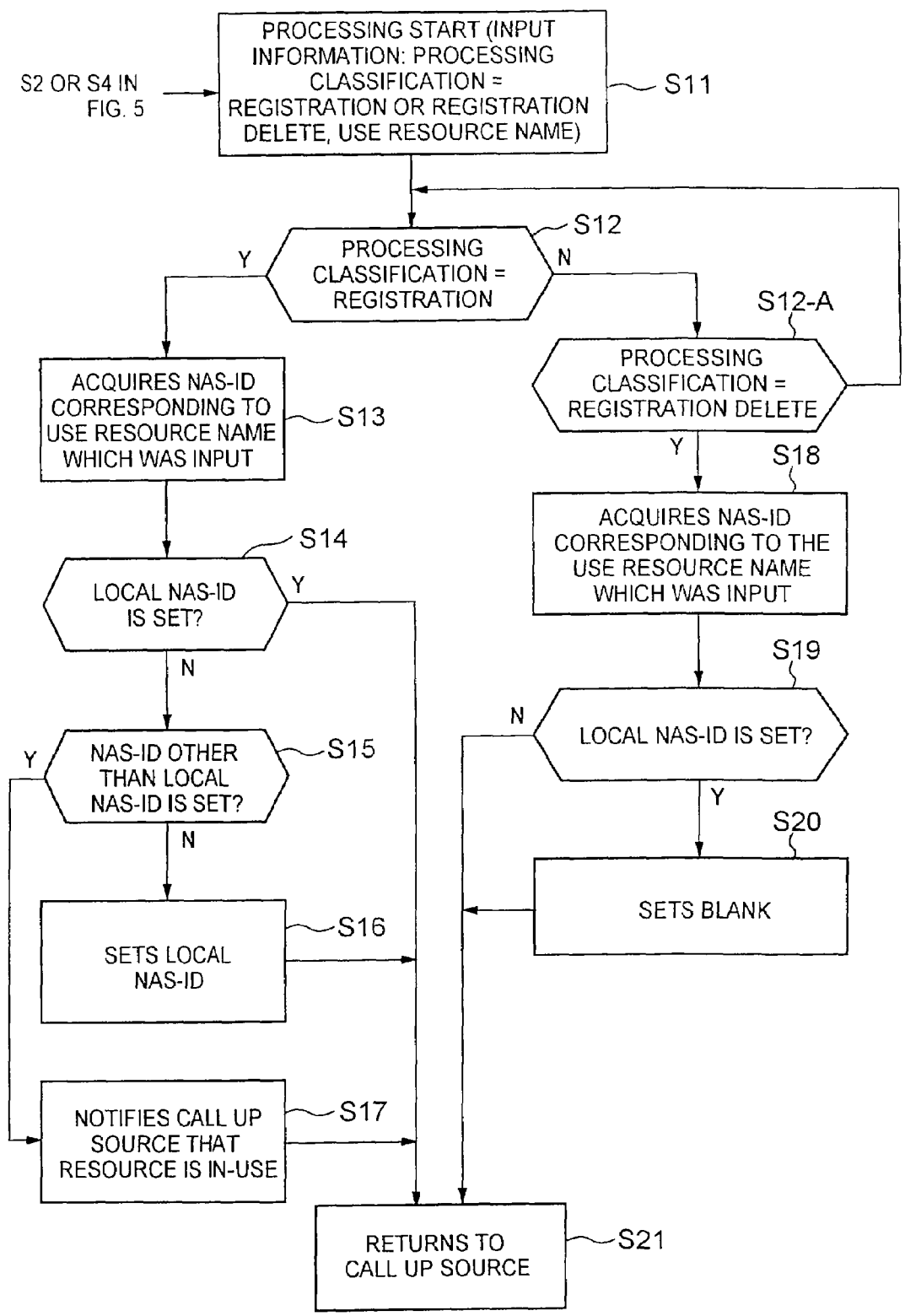
FIG. 6 is a flow chart depicting the operation flow of the use resource registration/delete section 35 of the NAS head 1.

FIG. 6 shows the operation flow of the use resource registration/delete section 35 of the NAS head 1.

The use resource registration/delete section 35 is called up by the application program 33, and starts processing (S11).

In S11, when the shared resource name to be used (hereafter called the "use resource name") and "registration" as the processing classification are input from the call up source (Y in S12), the use resource registration/delete section 35 acquires the NAS-ID corresponding to the use resource name which was input from the first management table 23A (S13).

As a result of S13, if no NAS-ID is set (N in S14 and N in S15), the use resource registration/delete section 35 sets the local NAS-ID "1" in the blank column corresponding to the use resource name which was input in S11, and returns to the call up source (S21).

If the acquired ID is the local NAS-ID "1" (Y in S14) as a result of S13, the use resource registration/delete section 35 returns to the call up source (S21).

If the acquired ID is an ID other than the local NAS-ID "1" as a result of S13 (N in S14 and Y in S15), this means that the status, where the shared resource is to be used, is being used by another NAS head, so the use resource registration/delete section 35 notifies the call up source that the resource is in-use (S17), and returns to the call up source (S21). Otherwise, the local NAS-ID is set in S16 prior to returning to the call up source in S21.

If the use resource name and "registration delete" as the processing classification are input from the call up source (N in S12 and Y in S12-A) in S11, the use resource registration/delete section 35 acquires the NAS-ID corresponding to the use resource name which was input from the first management table 23A (S18).

If the acquired ID is the local NAS-ID "1" (Y in S19) as a result of S18, then the use resource registration/delete section 35 deletes the NAS-ID "1" corresponding to the use resource name, which was input in S11, in the first management table 23A, sets a blank (S20), and returns to the call up source (S21).

If no NAS-ID is set as a result of S18, or if the acquired ID is an ID other than the local NAS-ID "1", then the use resource registration/delete section 35 performs nothing, or notifies an error to the call up source, and returns to the call up source (S21).

The above is the operation flow of the use resource registration/delete section 35 of the NAS head 1.

Figure 7:
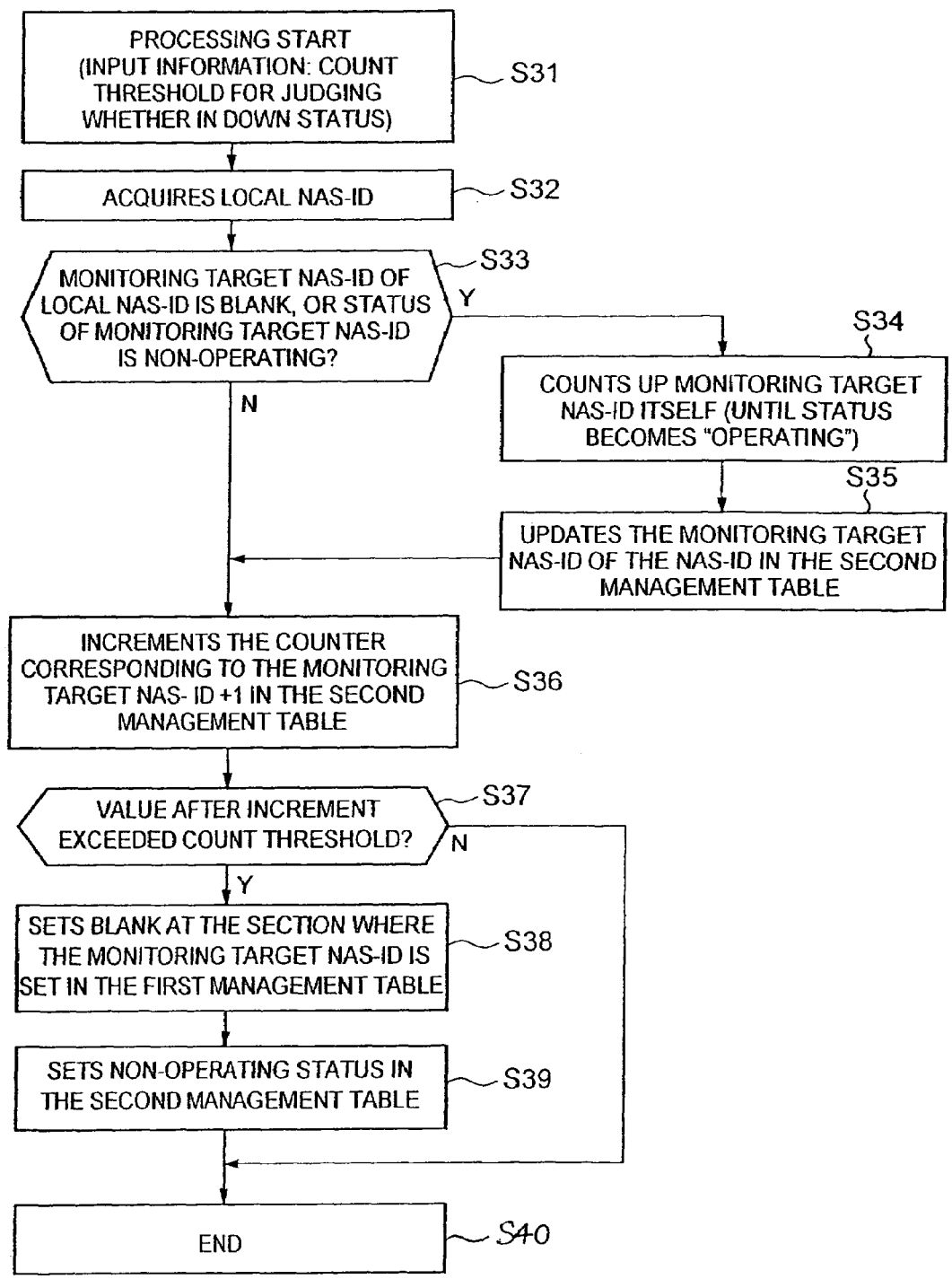
FIG. 7 is a flow chart depicting the operation flow of the count check section 37 of the NAS head 1.

FIG. 7 shows the operation flow of the count check section 37 of the NAS head 1.

The count check section 37 starts processing using the count value for judging the down status of the NAS head (hereafter called the "count threshold") as input information (S31).

The count check section 37 acquires the local NAS-ID "1" (S32).

Then the count check section 37 refers to the second management table 23B and judges whether the monitoring target NAS-ID column corresponding to the local NAS-ID "1" is blank, or the status column corresponding to the monitoring target NAS-ID "2", which is set there, is "non-operating" (S33).

If either is positive in the result of the judgment in S33, this means that the monitoring target of the NAS head 1 completely or substantially does not exist, so the count check section 37 refers to the second management table 23B, and adds 1 to the ID which is newly set in the monitoring target NAS-ID column or to the ID already set there until the ID of the NAS head, which status is "operating" and which is not monitored by any NAS head, will be detected (S34). When such an NAS-ID is detected, the count check section 37 sets this NAS-ID (this ID is assumed to be "2" in the following description) in the monitoring target NAS-ID column corresponding to the local NAS-ID "1" (S35).

When both are negative in the result of the judgment in S33 (S33N) or after S35, the counter check section 37 increments the count value of the monitoring target NAS-ID "2" corresponding to the local NAS-ID "1" by 1 (S36). And the count check section 37 judges whether the count value after the increment exceeds the count threshold which was input in S31 (S37).

As a result of S37, if the count value after the increment exceeds the above mentioned count threshold (Y in S37), the count check section 37 judges that the NAS head 2, which has the monitoring target NAS-ID "2", is down, and executes the following processing. In other words, the count check section 37 removes the monitoring target NAS-ID corresponding to the local NAS-ID "1", if it exists, in the first management table 23A, and sets a blank column (S38). And the count check section 37 removes the NAS-ID "2" from the monitoring target NAS-ID column corresponding to the local NAS-ID "1" in the second management table 23B, changes the status corresponding to the removed monitoring target NAS-ID "2" from "operating" to "non-operating" (S39), and ends this processing (S40).

As a result of S37, if the count value after the increment is the above mentioned count threshold or less (N in S37), then the count check section 40 ends processing there (S40).

The above is the operation flow of the count check section 37 of the NAS head 1. In this operation flow, the operation of incrementing the count value corresponding to the monitoring target NAS-ID by 1 need not be after the operation of S33 or S35, but may be at various timings. The count threshold which is input in S31 may be zero, the count value immediately after reset, or considering that the count up processing by monitoring continues even after reset, the count threshold may be a value slightly greater than the value immediately after reset (e.g. an arbitrary value of 1–5). In this operation flow, if it is judged that the NAS head 2 is down by the status of the second management table 23B shown in FIG. 3, the second management table 23B is updated to the content shown in FIG. 8(A), and if the NAS head 3, which has been the monitoring target of the NAS head 2, for example, is searched as a new monitoring target for the NAS head 1, where the monitoring target has been the NAS head 2, and the second management table 23B is updated to the content shown in FIG. 8(B).

FIG. 9 shows the operation flow of the reset section 39 of the NAS head 1.

The reset section 39 starts processing at a predetermined timing (S51). After processing starts, the reset section 39 resets the count value corresponding to the local NAS-ID "1" to zero in the second management table 23B (S52), and ends processing (S53).

The NAS head 1 was described above as a representative, but the configuration and functions of the other NAS heads 2 to 4 shall be understood by the above description on the NAS head 1.

According to the above described embodiment, each one of the NAS head 1 to 4 refers to the second management table 23B, judges whether the monitoring target NAS head is down depending on whether the count value corresponding to the monitoring target NAS-ID exceeds the count threshold, and performs exclusive control for use of the shared resource according to the result. By this, appropriate exclusive control becomes possible.

Also according to the above described embodiment, when the monitoring target is judged as in down status, each one of the NAS heads 1 to 4 searches a NAS head which is in operating status and which is not a monitoring target of any other NAS head, and sets this as the monitoring target. In other words, if one of the NAS heads 1 to 4 is down, a new monitoring relationship is dynamically formed by the other NAS heads in operating status. By this, setting and control by the user are unnecessary even if the monitoring relationship is changed by an NAS head being down or by the removal of an NAS head itself. Also even if a target NAS head becomes non-monitored status because the NAS which has been monitoring the target NAS head became down, another NAS head sets this target head as a new monitoring target, so continuous monitoring of the target NAS head is guaranteed.

Various variant forms of the above mentioned embodiment are possible.

In the first variant form, the reset section 39 of the NAS head 1 does not reset the count value corresponding to the local NAS-ID (in other words, the reset section 39 does not exist), but the count check section 37 judges whether the monitoring target NAS head (e.g. NAS head 2) is down or not by the date and time when the count value corresponding to an NAS head (e.g. NAS head 3), which the monitoring target NAS head is monitoring, was updated. This will now be described concretely (description will be simplified or omitted for sections which are the same as the above embodiment). In the following description, the monitoring target of the target NAS head is referred to as the "primary monitoring target", and the monitoring target of the primary monitoring target is referred to as the "secondary monitoring target" to assist in understanding the first variant form.

FIG. 10 shows the second management table 50 according to the first variant form.

In the second management table 50, an update time column for recording the date and time when the count value is counted up (hereafter called "update time") is created in addition to the content written in the second management table 23. In this column, the latest update time and the last update time are recorded.

Figure 11:
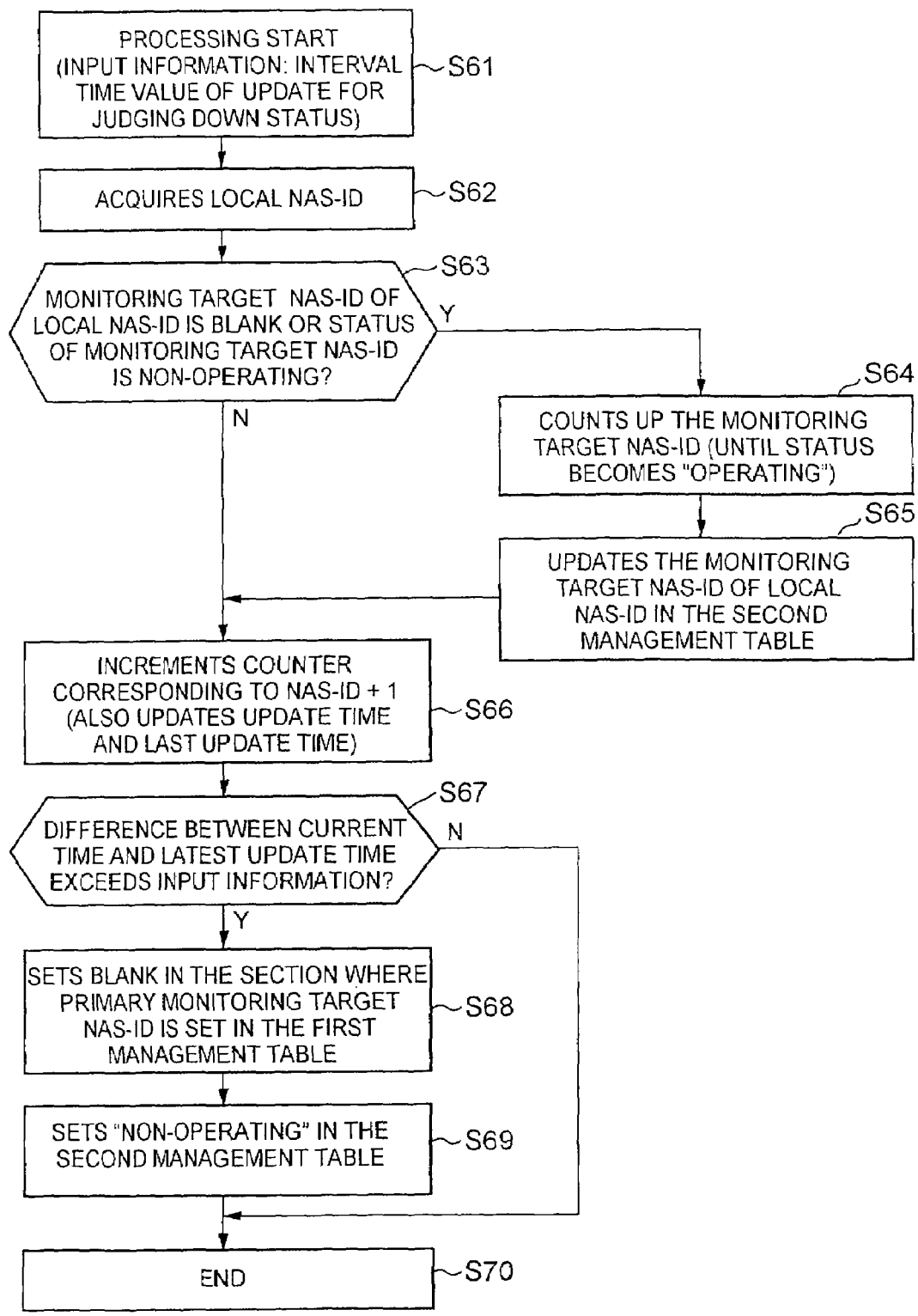
FIG. 11 is a flow chart depicting the operation flow of the count check section 37 of the target NAS head in the first variant form.

FIG. 11 shows the operation flow of the count check section 37 of the target NAS head according to the first variant form.

The count check section 37 starts processing using the time value (time value of the update time interval of the count value) when down status is judged as the input information (S61).

The count check section 37 acquires the local NAS-ID "1" (S62).

Then the count check section 37 refers to the second management table 23B, and judges whether the primary monitoring target NAS-ID column corresponding to the local NAS-ID is blank, or "non-operating" is set in the status column corresponding to the monitoring target NAS-ID, which is set in the primary monitoring target NAS-ID (S63).

If both are positive as a result of the judgment in S63, processing the same as S34–S35 in FIG. 7 is performed (S64–S65).

If both are negative as a result of the judgment in S33 (N in S63), or after S65 completes, the counter check section 37 increments the count value of the primary monitoring target NAS-ID by 1, and also updates the latest update time and the last update time (S66).

Then the count check section 37 refers to the update time column corresponding to the NAS-ID of the secondary monitoring target, which is the monitoring target of the primary monitoring target, calculates the difference between the current time and the latest time recorded in the column, and compares the result with the time value which was input in S61 (hereafter called "input time value") (S67).

If the calculated difference value exceeds the input time value as a result of S67 (Y in S67), it is judged that the primary monitoring target, which is supposed to count up the count value of the secondary monitoring target, is down, and the count check section 37 performs the following processing. In other words, if a primary monitoring target NAS-ID exists in the first management table 23A, the count check section 37 removes this and sets a blank (S68). And in the second management table 50, the count check section 37 removes the NAS-ID from the primary monitoring target NAS-ID column, changes the "status" corresponding to the removed primary monitoring target NAS-ID from "operating" to "non-operating" (S69), and ends this processing (S70).

According to this first variant form, each NAS head 1 to 4 can judge whether the primary monitoring target NAS head is down or not, even if the count value is not reset by the monitoring target NAS head.

A further variant form is possible for this first variant form. For example, the count check section 37 also calculates the difference value between the latest update time and the last update time, and if the difference value between the current time and the latest update time is greater than that difference value, it may be judged that the primary monitoring target is down. (In other words, when the difference value between the current time and the latest update time is greater than the time period of the count up performed by the primary monitoring target, it is judged that the primary monitoring target is down.)

As a second variant form, when the NAS head is operated again after being set from operating to non-operating in the second management table 23B, the status corresponding to the local NAS-ID may be forcibly changed from "non-operating" to "operating". In this case, which NAS head becomes the monitoring target of the re-operating NAS and by which NAS head the re-operating NAS is monitored may be determined at an arbitrary timing. For example, the re-operating NAS head may simply be connected to the network 17 in standby status until two or more other NAS heads become non-operating. For another example, if an NAS head having an ID obtained by incrementing the local NAS-ID by a predetermined value (e.g. 1) becomes the monitoring target, that monitoring target also becomes the monitoring target of another NAS head, so the re-operating NAS head may access this other NAS head and change the monitoring target of this NAS head to the re-operating NAS head itself. Specifically, if the re-operating NAS head is the NAS head 2, for example, the monitoring target of the NAS head 2 is the NAS head 3 which has the ID "3" when the local NAS-ID "2" is incremented by 1, and in this case, this NAS head 3 also becomes the monitoring target of another NAS head, NAS head 1 for example, so the re-operating NAS head 2 access the other NAS head 1 and changes the monitoring target thereof to the NAS head 2 itself (in other words, the monitoring target NAS-ID of the NAS head 1 may be changed from "3" to "2" in the second management table 23B).

A preferred embodiment and some variant forms were described above, but these are examples for describing the present invention, and the scope of the present invention shall not be limited to this embodiment and variant forms. The present invention can be implemented by various other forms. For example, the present invention may be applied not only to NAS but also to SAN. Specifically, when a plurality of hosts 10A and 10B are connected to the shared LU 18 via a SAN, each host may perform similar operations to that of the above mentioned NAS heads 1 to 4.

Also in the above description, the technology for dynamically changing the monitoring target can also be expressed abstractly as follows, for example.

Expression 1

A system comprising a plurality of data access devices and a shared storage device to which the plurality of data access devices can access, wherein the shared storage device stores a plurality of updatable information corresponding to the plurality of data access devices respectively, and each data access device further comprises means for monitoring another data access device, means for checking the updatable information corresponding to the monitoring target data access device, and means for judging that the data access device of its own monitoring target is not in operating status when the checked updatable information is not a predetermined update result, and searching another data access device in operating status which is not monitored by any data access device, and making this a new monitoring target.

Expression 2

The system according to Expression 1, wherein the shared storage device stores the monitoring relationship information to indicate the correspondence of the data access device and the monitoring target data access device thereof, and the operating status information to indicate whether each data access device is in operating status or not, and the data access device further comprises: means for updating the operating status information based on the judgment that the data access device of the monitoring target of this data access device itself is not in operating status when the target updatable information corresponding to the monitoring target data access device is not a predetermined update result; means for updating the monitoring relationship information excluding the data access device which was judged as non-operating status from the monitoring target; means for searching another data access device in operating status, which is monitoring the target of the data access device which became non-operating status based on the monitoring relationship information and the operating status information; and means for updating the monitoring relationship information with selecting the other data access device as a new monitoring target.

What is claimed is:

1. An exclusive control system for using a shared resource, comprising:
    a plurality of data access devices including a first and second data access device devices,
    and a shared storage device to which said plurality of data access devices can access, wherein
    said shared storage device stores a shared resource which said plurality of data access devices can use, and a first updatable information for said first data access device;
    said first access device comprises an access controller that accesses said shared resource if said shared resource is in unused status, that is, not being used by any of said data access devices, and said access controller does not access said shared resource if said shared resource is being used by any of said data access devices, and an information updater that updates said first updatable information; and
    said second data access device comprises a resource releaser that cancels said use status and releases said shared resource to said unused status if said first updatable information is not in a predetermined update result and said shared resource remains in use status being used by said first data access device,
    wherein when each data access device monitors any of said data access devices, said second data access device judges that said first data access device, which is the monitoring target of said second data access device, is not in operating status if said first updatable information is not updated, searches a subsequent data access device other than said first data access device in operating status which is not monitored by any of said data access devices, and monitors said subsequent data access device as a monitoring target.

2. The system according to claim 1, wherein
    said first updatable information is a count value which is incremented by said subsequent data access device,
    said information updater of said first data access device resets said incremented count value to a predetermined value at a predetermined timing, and
    said resource releaser of said second data access device releases said shared resource to said unused status if said count value exceeds a certain threshold and said shared resource is in said use status.

3. The system according to claim 1, wherein
    said plurality of data access devices include a third data access device,
    a third updatable information for said third data access device is recorded in said shared storage device,
    said first data access device further comprises another information updater that updates said third updatable information, and
    said resource releaser of said second data access device releases said shared resource to said unused status if said third updatable information is not in a predetermined result and said shared resource is in said use status.

4. The system according to claim 3, wherein
    update time of said third updatable information is also recorded in said shared storage device,
    said first data access device further comprises another information updater that updates said third updatable information and recording update time thereof in said shared storage device, and
    said resource releaser of said second data access device judges whether said first data access device is in operating status or not based on the update time recorded in said shared storage device, and releases said shared resource to said unused status if it is judged that said first data access device is not in operating status and said shared resource is in said use status.

5. The system according to claim 1, wherein
    said shared storage device stores monitoring relationship information to indicate the correspondence of data access device and monitoring target data access device thereof, and operating status information to indicate whether each data access device is in operating status or non-operating status, and
    said second data access device further comprises:
    a component that updates said operating status information based on the judgment that the status of said first data access device of the monitoring target thereof has changed from operating status to non-operating status when said first updatable information is not updated;
    a component that updates said monitoring relationship information excluding said first data access device from the monitoring target;
    a component that searches another data access device in operating status, which is a monitoring target of said first data access device of which status has become non-operating status, based on said monitoring relationship information and said operating status information; and
    a component that updates said monitoring relationship information with selecting said other data access device as a new monitoring target.

6. The system according to claim 1, wherein
    said plurality of data access devices include a third data access device,
    said second data access device monitors said first data access device, said first data access device monitors said third data access device, and said third data access device monitors said second data access device, said shared storage device stores the following information (A) to (C) for each of said first to third data access devices, (A) updatable information which is updated to a desired content by a host data access device which monitors said first to third data access devices, and is updated to another desired content by said data access device, (B) operating status information to indicate whether the data access device is in operating status or non-operating status, and (C) slave device information to indicate a slave data access device which the data access device monitors, the resource releaser of said second data access device executes the following (1) to (3) processing when said first updatable information is not in a predetermined update result or the third updatable information corresponding to said third data access device is not in a predetermined update result, (1) processing for changing said operating status information corresponding to said first data access device from information to indicate the operating status to information to indicate said non-operating status, (2) processing for changing the slave device information of said second data access device from information to indicate said first data access device to information to indicate said third data access device, which is said slave data access device of said first data access device, and (3) processing for releasing said shared resource to the unused status when said shared resource is in the use status by said first data access device.

7. An exclusive control method for using a shared resource, executed in a system comprising a plurality of data access devices including a first and second data access devices and a shared storage device to which said plurality of data access devices can access, wherein said shared storage device stores a shared resource which said plurality of data access devices can use, and a first updatable information for said first data access device, said exclusive control method comprising:

accessing said shared resource by said first data access device, if said shared resource is in unused status, that is, not being used by any of said data access devices, and not accessing said shared resource if said shared resource is being used by any of said data access devices;

updating said first updatable information by said first data access device; and canceling said use status and releasing said shared resource to said unused status by said second data access device, if said first updatable information is not in a predetermined update result and said shared resource remains in use status being used by said first data access device, wherein when each data access device monitors any of said data access devices, said second data access device judges that said first data access device, which is the monitoring target of said second data access device, is not in operating status if said first updatable information is not updated, searches a subsequent data access device other than said first data access device in operating status which is not monitored by any of said data access devices, and monitors said subsequent data access device as a monitoring target.

8. A data access device for accessing a shared storage device to which a plurality of data access devices can access, said shared storage device storing a shared resource which said plurality of data access devices can use, and updatable information which is updated by another data access device, said data access device comprising:

an access controller that accesses said shared resource if said shared resource is in unused status, that is, not being used by any of said data access devices, and does not access said shared resource if said shared resource is being using by any of said data access devices; and a resource releaser that cancels said use status and releases said shared resource to said unused status if said updatable information is not in a predetermined update result and said shared resource remains in use status being used by any of said data access devices, wherein when each data access device monitors any of said separate data access devices, said second data access device judges that said first data access device, which is the monitoring target of said second data access device, is not in operating status if said first updatable information is not updated, searches a subsequent data access device other than said first data access device in operating status which is not monitored by any of said data access devices, and monitors said subsequent data access device as a monitoring target.

9. The system according to claim 1, wherein said plurality of data access devices are comprised of N data access devices and a plurality of updatable information;

said control system further comprising a monitor configured to monitor a (p−1)th data access device by monitoring (p−1)th updatable information which is connected with said (p−1)th data access device; and a monitoring target updater of said pth data access device configured to update the monitoring target of said pth data access device to a (p−2)th data access device in operating status if said (p−1)th updatable information is not in a predetermined update result;

wherein said pth data access device is monitored by a (p+2)th data access device;

wherein N is an integer greater than or equal to 3, wherein p is an integer greater than or equal to 1 and less than or equal to N, wherein (p+1) is equal to 1 when p is equal to N, and wherein (p−1) is equal to N when p is equal to 1.

* * * * *